April 23, 1957 N. C. JESSEN 2,789,925
COATED WELD RODS WITH LOW CARBON CORE
Filed Jan. 11, 1955
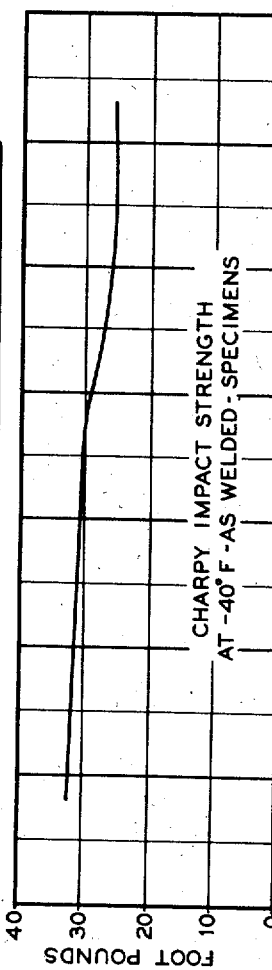
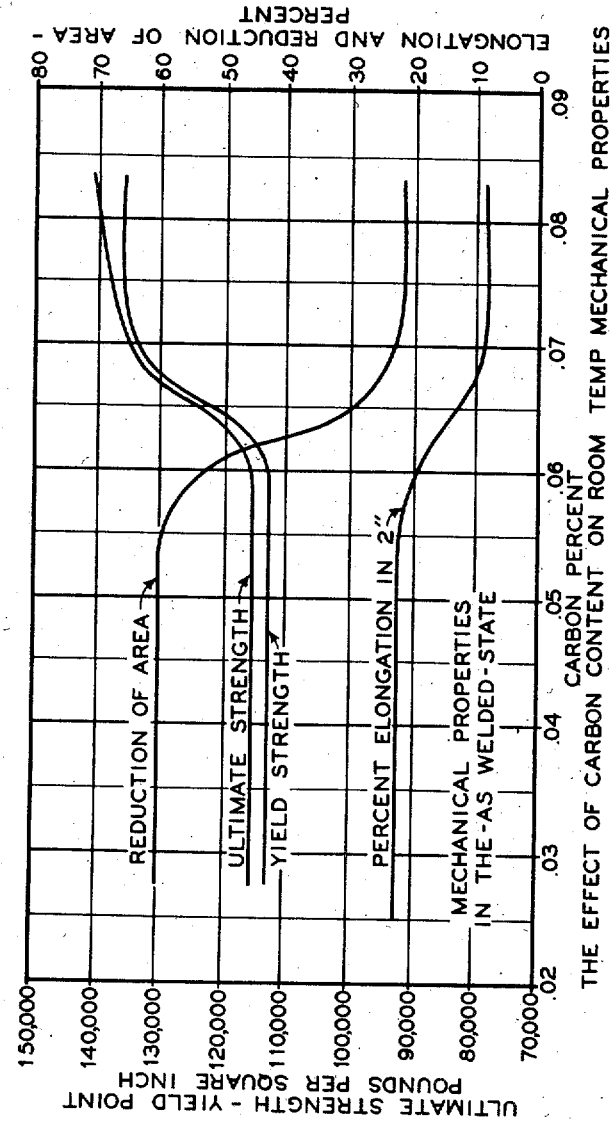
INVENTOR.
NICHOLAS C. JESSEN
BY

2,789,925

COATED WELD RODS WITH LOW CARBON CORE

Nicholas C. Jessen, Akron, Ohio, assignor to The Babcock & Wilcox Company, New York, N. Y., a corporation of New Jersey Application January 11, 1955, Serial No. 481,254

18 Claims. (Cl. 117—207)

This invention relates to welding electrodes for welding low alloy, ferritic, hardenable materials and, more particularly, to improved electrodes for such welding having ferrous metal cores with a low carbon content and low hydrogen type coatings, and capable of producing low carbon weld deposits, alloying constituents, in amounts sufficient to provide the desired alloy content in the weld deposit, being incorporated in the core or in the coating, or being divided between the core and coating. This application is a continuation-in-part of my copending application Serial No. 435,175 filed June 8, 1954.

By the term "low alloy" steels as used herein is meant a steel having constituents, such as chromium, molybdenum, manganese, nickel and the like, in which the percentage of any constituent is less than about 10%. Typical compositions of this type are chromium steels containing chromium up to about 9% with or without molybdenum up to about 2%. Other typical steels of the "low alloy" type may contain manganese, silicon, molybdenum and vanadium in amounts of 2.5% or less, and nickel up to about 9.5% nominal.

Almost all low allow steels containing chromium and carbon are, in their as-welded or quenched condition, hardened to an extent far greater than the normal carbon steels not containing any additional alloying agents. While the factor most responsible for this hardening is the carbon content, an appreciable carbon content is useful in obtaining desired strength characteristics. However, the properties obtainable with relatively high carbon contents may be substantially duplicated with very low carbon contents by using alloying ingredients other than carbon, such as manganese, chromium, molybdenum, etc., so that approximately equivalent characteristics of the weld deposit can be obtained, even though the carbon content is kept at a low enough level that the aforementioned hardening is reduced. The advantage of this substitution is that a weld deposit having high temperature properties approximately equivalent to those obtainable with a higher carbon content can be produced without the deposit being hardened to the extent that it would be if it had the higher carbon content.

Although low alloy electrodes, containing small percentages of chromium and molybdenum, for example, will occasionally have carbon contents as low as 0.05%, the average carbon content in such Cr-Mo weldrod obtained from the manufacturer will more nearly approach 0.07%–0.08%. Experimental work indicates that the ductility of a weld deposit made with a Cr-Mo weldrod of this type, in the as-welded state, varies directly with the alloy content and the carbon content. Up to and including an alloy content of 5% Cr-0.05% Mo, the as-welded ductility, which is the ductility of the weld metal in the as-deposited state without subsequent heat treatment, is of the order of 20% if the carbon content is less than 0.06%. When the carbon content or "points" is increased only slightly above 0.06%, the ductility drops sharply to about 10% and, as the carbon content approaches 0.10%, as-welded ductilities as low as 1.0% can be expected.

Such low ductilities in the as-welded state require very careful preheating of the workpieces, and preheating to unusually high temperatures, in order to avoid cracking of the weld deposit. Preheats of the order of 500–600° F. are common for this kind of welding. It will therefore be recognized that a greater as-welded ductility will permit a substantial lowering of the preheat temperature with resultant greater comfort to the welder during the work and thus better performance by the welder.

More specifically, welding rods or electrodes according to the invention have ferrous metal cores with a carbon content of less than 0.06%. The core may be a low carbon steel or a commercially pure iron, a typical commercially pure iron being that known as "Armco iron" having a carbon content not exceeding 0.02%. The low carbon core is provided with a low hydrogen type coating, such as a lime, lime-titania, or titania-lime coating comprising a coating compounded from minerals essentially free of chemically combined moisture. Typical minerals of this type are calcium fluoride, calcium carbonate, titanium dioxide, calcium silicate, magnesium carbonate, etc. The binder is selected from the group comprising, for example, sodium silicate and potassium silicate. Such coatings are characterized by the fact that they do not evolve deleterious amounts of water vapor or hydrogen during welding.

Desired alloying additions may be provided solely in the coating, solely in the metal core, or in both the coating and the core. The alloying ingredients may be either in the form of pure ingredients or as compounds such as, for example, nickel oxide, ferro-silicon, chrome metal, or ferro-molybdenum. A particular advantage of the low carbon content is the fact that porosity-free welds can be more readily obtained with a low carbon electrode than with an electrode in which the carbon content is in excess of 0.06%. It is believed that porosity results partially from a reaction of carbon with the carbon dioxide and water vapor atmosphere surrounding the molten pool. Hence, with the carbon content of the molten metal kept at a very low level, and with a coating being used which produces little or no water vapor, the reaction is kept at a minimum so that the formation of gas bubbles in the molten metal is likewise at a minimum.

For an understanding of the invention principles, reference is made to the following description of typical embodiments thereof, and to the appended drawing.

In the drawing:

Fig. 1 is a sectional view through a coated weldrod embodying the invention; and Figs. 2 and 3 are charts indicating the relationship between the carbon content and the mechanical properties of low alloy steel weld metal in the as-welded state.

In carrying out the invention principles, a welding wire or core 10 is formed of low carbon steel, or of commercially pure iron, having a carbon content of less than 0.06%. A specific commercially pure iron which can be used effectively is that known as "Armco iron," which has a carbon content not exceeding 0.02%.

Core 10 is then coated in any known manner, for example by extrusion, with a low hydrogen type coating 15 compounded from minerals essentially free of chemically combined moisture, and a suitable binder. Coating 15 may be a lime coating, lime-titania coating, or titania-lime coating, coatings of these types being well known to those skilled in the art. Typical minerals used in a low hydrogen coating are calcium fluoride, calcium carbonate, titanium dioxide, calcium silicate, magnesium carbonate, and similar materials. Preferred binders are sodium silicate or potassium silicate.

A lime type coating has a significantly high percentage of calcium carbonate, a lime-titania type coating contains also titanium dioxide, and a titania or titania-lime type coating contains a significantly high percentage of titanium dioxide.

In accordance with the invention, the alloying ingredients are incorporated in the coating, in the core, or in both. When the core is commercially pure iron, all the alloying ingredients are incorporated in the coating. As is well known to those skilled in the art, some of the constituents of a welding rod may be lost during transfer across the arc, and hence the percentages of these constituents in the weld deposit may be less than the percentages thereof in the welding rod. To compensate for such losses, the percentages of such constituents in the welding rod are set at values sufficiently above those desired in the deposit so as to compensate for losses occurring in transfer across the arc.

The alloying constituents thus added to the weld rod of the invention are selected in such percentages that the alloying constituents in the weld deposit will fall within the following range of composition:

| | Percent |
|---|---|
| Cr | 0.00–9.00 |
| Mo | 0.00–2.00 |
| Mn | 0.00–2.00 |
| Si | 0.00–2.00 |
| Ni | 0.00–9.5 |
| V | 0.00–0.50 |

A preferred range within this broader range is as follows:

| | Percent |
|---|---|
| Cr | 0.40–9.00 |
| Mo | 0.00–1.10 |
| Mn | 0.00–1.30 |
| Si | 0.00–1.75 |
| Ni | 0.00–9.5 |
| V | 0.00–0.40 |

The alloying constituents may be added either in the pure form or as compounds. For example, the chromium may be chrome metal or ferro-chrome, the silicon may be added in the form of ferro-silicon, the molybdenum in the form of ferro-molybdenum, and the manganese as ferro-manganese. The nickel may be nickel oxide or metallic nickel.

Typical low alloy electrodes manufactured in accordance with the invention are those known to the art as "Croloy 1", "Croloy 2", "Croloy 2¼", and "Croloy 5." In naming these "Croloy" electrodes or weld rods in accordance with the invention, alloy ingredients are added to a weld rod having a low hydrogen type coating, which is applied to a ferrous metal core having a carbon content not exceeding 0.05%. The alloy analyses for the weld deposits formed by such weld rods are as follows:

"Croloy 1"

| | Percent |
|---|---|
| Cr | 0.75–1.25 |
| Mo | 0.40–0.60 |

"Croloy 2"

| | Percent |
|---|---|
| Cr | 1.75–2.25 |
| Mo | 0.40–0.60 |

"Croloy 2¼"

| | Percent |
|---|---|
| Cr | 2.00–2.50 |
| Mo | 0.90–1.10 |

"Croloy 5"

| | Percent |
|---|---|
| Cr | 4.00–6.00 |
| Mo | 0.40–0.60 |

The invention may also be utilized in manufacturing weld rods having a composition specifically designed for welding of high tensile steels, such as armor plate, and for applications involving low temperature service where high impact strength is desired. In such case, the core is steel or commercially pure iron having a carbon content not exceeding 0.05%. The alloying constituents are added to the low hydrogen coating, the core, or both so as to give weld deposit alloy analyses as in the two typical examples given below.

Rod #1

| | Percent |
|---|---|
| Mn | 0.50–1.00 |
| Si | 0.30–1.00 |
| Ni | 1.50–2.50 |
| Mo | 0.50–0.80 |
| V | 0.10–0.20 |

Rod #2

| | Percent |
|---|---|
| Mn | 0.80–1.30 |
| Si | 0.30–1.00 |
| Ni | 1.50–2.50 |
| Mo | 0.70–1.10 |
| V | 0.20–0.40 |

Rod #3

| | Percent |
|---|---|
| Mn | 0.40–2.00 |
| Si | 0.30–1.00 |
| Ni | 0.00–1.00 |
| Mo | 0.25–0.75 |
| V | 0.00–0.25 |

Rod #4

| | Percent |
|---|---|
| Mn | 0.40–1.50 |
| Si | 0.30–1.00 |
| Ni | 0.75–1.75 |
| Mo | 0.00–0.75 |
| V | 0.00–0.25 |

Rod #5

| | Percent |
|---|---|
| Mn | 0.40–1.50 |
| Si | 0.30–1.00 |
| Ni | 1.50–2.50 |
| Mo | 0.00–0.90 |
| V | 0.00–0.25 |

Rod #6

| | Percent |
|---|---|
| Mn | 0.40–1.50 |
| Si | 0.30–1.00 |
| Ni | 2.50–3.50 |
| Mo | 0.00–0.90 |
| V | 0.00–0.25 |

The ductility of a low alloy weld deposit, formed with rods of the compositions listed above, in the as-welded state varies with the carbon content. The as-welded ductility, which is the ductility of the weld metal as deposited and without heat treatment, is of the order of 20% with a carbon content of less than 0.055%. When the carbon content is increased just slightly above 0.055%, the as-welded ductility drops sharply to about 10%. In Figure 2, this is indicated by the sharp drop in the "Reduction of Area" and "Percent Elongation" curves at the 0.055% carbon point.

In Fig. 3, it will be noted that there is a pronounced drop in impact strength of weld deposits at −40° F. at the 0.055% carbon point, the weld deposits being in the as-welded condition without heat treatment.

The properties depicted in Figs. 2 and 3 permit a substantial lowering of preheat requirements when using the weld rods of the invention, as well as the obtaining of good ductilities or high impact strength at low temperatures without subsequent heat treatment.

While a specific embodiment of the invention has been shown and described in detail to illustrate the application of the invention principles, it will be understood that the invention may be embodied otherwise without departing from such principles.

What is claimed is:

1. In a welding electrode of the type having a fusible metal core with a mineral coating thereon, and having incorporated therein alloying ingredients including Mo and at least one of Cr, Mn, Si, Ni and V with the amount of any one alloying ingredient not exceeding 10%; the improvement comprising a ferritic steel core having a carbon content not exceeding 0.05%.

2. In a welding electrode of the type having a fusible metal core with a low hydrogen type mineral coating thereon, and having incorporated therein alloying ingredients including Mo and at least one of Cr, Mn, Si, Ni and V with the amount of any one alloying ingredient not exceeding 10%; the improvement comprising a ferritic steel core having a carbon content not exceeding 0.05%.

3. A welding electrode as claimed in claim 2 in which the carbon content of the core does not exceed 0.03%.

4. A welding electrode as claimed in claim 1 in which the alloying ingredients are incorporated in the coating.

5. A welding electrode as claimed in claim 1 in which the alloying ingredients are incorporated in the core.

6. A welding rod as claimed in claim 2 in which the alloying ingredients include, by weight, molybdenum up to 2.00%, and chromium up to 9.00%.

7. A welding rod as claimed in claim 2 in which the alloying ingredients include, by weight, molybdenum from 0.40% to 1.10%, and chromium from 0.75% to 6%.

8. A welding rod as claimed in claim 2 in which the alloying ingredients include, by weight, chromium from 0.75% to 1.25%, and molybdenum from 0.40% to 0.60%.

9. A welding rod as claimed in claim 2 in which the alloying ingredients include, by weight, chromium from 1.75% to 2.25%, and molybdenum from 0.40% to 0.60%.

10. A welding rod as claimed in claim 2 in which the alloying ingredients include, by weight, chromium from 2.00% to 2.50%, and molybdenum from 0.90% to 1.10%.

11. A welding rod as claimed in claim 2 in which the alloying ingredients include, by weight, chromium from 4.00% to 6.00%, and molybdenum from 0.40% to 0.60%.

12. A welding rod as claimed in claim 2 in which the alloying ingredients include, by weight, manganese from 0.40% to 2.00%, silicon from 0.30% to 1.00%, nickel up to 3.50%, molybdenum up to 1.10%, and vanadium up to 0.40%.

13. A welding rod as claimed in claim 2 in which the alloying ingredients include, by weight, manganese from 0.50% to 1.00%, silicon from 0.30% to 1.00%, nickel from 1.50% to 2.50%, molybdenum from 0.50% to 0.80%, and vanadium from 0.10% to 0.20%.

14. A welding rod as claimed in claim 2 in which the alloying ingredients include, by weight, manganese from 0.80% to 1.30%, silicon from 0.30% to 1.00%, nickel from 1.50% to 2.50%, molybdenum from 0.70% to 1.10%, and vanadium from 0.20% to 0.40%.

15. A welding rod as claimed in claim 2 in which the alloying ingredients include, by weight, manganese from 0.40% to 2.00%, silicon from 0.30% to 1.00%, nickel up to 1.00%, molybdenum from 0.25% to 0.75%, and vanadium up to 0.25.

16. A welding rod as claimed in claim 2 in which the alloying ingredients include, by weight, manganese from 0.40% to 1.50%, silicon from 0.30% to 1.00%, nickel from 0.75% to 1.75%, molybdenum up to 0.75%, and vanadium up to 0.25%.

17. A welding rod as claimed in claim 2 in which the alloying ingredients include, by weight, manganese from 0.40% to 1.50%, silicon from 0.30% to 1.00%, nickel from 1.50% to 2.50%, molybdenum up to 0.90%, and vanadium up to 0.25%.

18. A welding rod as claimed in claim 2 in which the alloying ingredients include, by weight, manganese from 0.40% to 1.50%, silicon from 0.30% to 1.00%, nickel from 2.50% to 3.50%, molybdenum up to 0.90%, and vanadium up to 0.25%.

References Cited in the file of this patent

UNITED STATES PATENTS

| | | |
|---|---|---|
| 1,544,422 | Becket | June 30, 1925 |
| 1,559,015 | Stoody | Oct. 27, 1925 |
| 2,011,706 | Blumberg | Aug. 20, 1935 |
| 2,140,237 | Leitner | Dec. 13, 1938 |
| 2,432,773 | Lee | Dec. 16, 1947 |
| 2,564,474 | Field | Aug. 14, 1951 |